(12) United States Patent
Sugiyama et al.

(10) Patent No.: US 9,557,435 B2
(45) Date of Patent: Jan. 31, 2017

(54) ACOUSTIC ISOLATORS

(71) Applicant: Schlumberger Technology Corporation, Sugar Land, TX (US)

(72) Inventors: Hitoshi Sugiyama, Sagamihara (JP); Yoshino Sakata, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 417 days.

(21) Appl. No.: 13/723,112

(22) Filed: Dec. 20, 2012

(65) Prior Publication Data

US 2014/0177391 A1 Jun. 26, 2014

(51) Int. Cl.
| | |
|---|---|
| G01V 3/18 | (2006.01) |
| G01V 1/52 | (2006.01) |
| G01V 1/46 | (2006.01) |
| G01V 1/44 | (2006.01) |
| E21B 47/01 | (2012.01) |

(52) U.S. Cl.
CPC ............... *G01V 3/18* (2013.01); *E21B 47/01* (2013.01); *G01V 1/44* (2013.01); *G01V 1/46* (2013.01); *G01V 1/52* (2013.01); *G01V 1/523* (2013.01)

(58) Field of Classification Search
CPC ... G01V 1/44–1/52; G01V 1/523; G01V 3/18; E21B 47/01; E21B 44/00
See application file for complete search history.

(56) References Cited

U.S. PATENT DOCUMENTS

| | | | |
|---|---|---|---|
| 3,406,779 A | 10/1968 | Zemanek et al. | |
| 3,811,529 A | 5/1974 | Crawford | |
| 4,698,791 A * | 10/1987 | Cunningham | 367/25 |
| 4,850,450 A * | 7/1989 | Hoyle et al. | 181/102 |
| 5,639,997 A * | 6/1997 | Mallett | 181/102 |
| 6,084,826 A * | 7/2000 | Leggett, III | 367/82 |
| 6,474,439 B1 | 11/2002 | Hoyle et al. | |
| 6,494,288 B1 | 12/2002 | Tashiro et al. | |
| 6,564,899 B1 | 5/2003 | Arian et al. | |
| 6,614,360 B1 * | 9/2003 | Leggett et al. | 340/853.1 |
| 6,615,949 B1 * | 9/2003 | Egerev et al. | 181/102 |
| 6,739,423 B2 | 5/2004 | Tashiro et al. | |
| 7,334,661 B2 | 2/2008 | Pabon et al. | |
| 7,336,562 B1 | 2/2008 | Hoyle et al. | |
| 2002/0157895 A1* | 10/2002 | Dubinsky et al. | 181/102 |

(Continued)

FOREIGN PATENT DOCUMENTS

EP 0261825 A2 3/1988

OTHER PUBLICATIONS

International search report for the equivalent PCT patent application No. PT/IB2013/061175 issued on Apr. 30, 2014.

(Continued)

*Primary Examiner* — Hai Phan
*Assistant Examiner* — Orlando Bousono
(74) *Attorney, Agent, or Firm* — Trevor G. Grove (57) ABSTRACT

Acoustic isolators are disclosed herein. An example apparatus includes a transmitter to transmit an acoustic signal. The example apparatus also includes an acoustic isolator substantially surrounding a receiver, and the receiver is to receive the acoustic signal via an opening in the acoustic isolator. The transmitter and the acoustic isolator are coupled to a base. The acoustic isolator includes a first layer coupled to a second layer defining a plurality of spaces. The second layer is to provide an acoustic impedance mismatch.

19 Claims, 7 Drawing Sheets

(56) References Cited

U.S. PATENT DOCUMENTS

| | | |
|---|---|---|
| 2003/0014190 A1* | 1/2003 | Dubinsky et al. ............ 702/7 |
| 2003/0123326 A1* | 7/2003 | Wisniewski et al. ......... 367/140 |
| 2004/0141415 A1 | 7/2004 | Redding et al. |
| 2005/0023074 A1* | 2/2005 | Dubinsky et al. ............ 181/108 |
| 2005/0034917 A1* | 2/2005 | Mathiszik et al. ............ 181/108 |
| 2005/0150655 A1* | 7/2005 | Duong et al. ................ 166/249 |
| 2005/0150713 A1* | 7/2005 | Garcia-Osuna et al. ..... 181/108 |
| 2005/0152219 A1* | 7/2005 | Garcia-Osuna et al. ....... 367/25 |
| 2005/0167101 A1* | 8/2005 | Sugiyama ..................... 166/249 |
| 2006/0013065 A1* | 1/2006 | Varsamis et al. ............... 367/76 |
| 2007/0056794 A1 | 3/2007 | Cox et al. |
| 2007/0153629 A1* | 7/2007 | Drumheller et al. ......... 367/162 |
| 2007/0156359 A1* | 7/2007 | Varsamis et al. ............... 702/69 |
| 2009/0107757 A1 | 4/2009 | Lindner et al. |
| 2009/0183941 A1 | 7/2009 | Pabon et al. |
| 2010/0089574 A1* | 4/2010 | Wideman et al. ......... 166/272.1 |
| 2010/0157741 A1* | 6/2010 | Drumheller et al. ......... 367/162 |
| 2011/0073368 A1* | 3/2011 | Han et al. ...................... 175/40 |
| 2011/0094729 A1* | 4/2011 | Braden et al. ............... 166/65.1 |
| 2011/0188345 A1* | 8/2011 | Wang ............................. 367/34 |
| 2011/0222369 A1 | 9/2011 | DiFoggio et al. |
| 2011/0242936 A1* | 10/2011 | Pabon et al. ................... 367/35 |
| 2011/0255370 A1* | 10/2011 | Hirabayashi et al. .......... 367/31 |
| 2011/0280101 A1* | 11/2011 | Wang ............................. 367/25 |
| 2011/0280102 A1* | 11/2011 | Wang et al. .................... 367/31 |
| 2011/0286307 A1* | 11/2011 | Wang ............................. 367/82 |
| 2012/0044783 A1* | 2/2012 | Wang et al. .................... 367/35 |
| 2012/0111633 A1* | 5/2012 | Kumar ............................ 175/50 |
| 2012/0253680 A1* | 10/2012 | Thompson et al. ............ 702/13 |
| 2013/0058193 A1* | 3/2013 | Roberts et al. ................. 367/35 |

OTHER PUBLICATIONS

European Search Report for Application No. 13863725.1. Dated Dec. 8, 2016. (4 pgs).

\* cited by examiner

ACOUSTIC ISOLATORS

BACKGROUND OF THE DISCLOSURE

An acoustic sensor is often employed on a downhole tool to measure properties of a subterranean formation. For example, the acoustic sensor may be used to determine formation compressional slowness, Stonely slowness, and/or other properties. Generally, a transmitter generates an acoustic signal that propagates toward the subterranean formation. The signal is refracted by the subterranean formation toward a receiver of the acoustic sensor, which receives the signal. The signal may then be processed to determine the properties of the subterranean formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example apparatus disclosed herein includes a transmitter to transmit an acoustic signal. The example apparatus also includes an acoustic isolator substantially surrounding a receiver, which is to receive the acoustic signal via an opening in the acoustic isolator. The transmitter and the acoustic isolator are coupled to a base. The acoustic isolator includes a first layer coupled to a second layer defining a plurality of spaces. The second layer is to provide an acoustic impedance mismatch.

Another example apparatus disclosed herein includes an acoustic transmitter, an acoustic isolator, and an acoustic attenuator coupled to a base. The acoustic isolator includes a first layer and a second layer. The first layer includes a plurality of pores. An acoustic receiver is coupled to the acoustic isolator, and the acoustic isolator surrounds a portion of the acoustic receiver. The acoustic attenuator is disposed between the acoustic isolator and the acoustic transmitter.

Another example apparatus disclosed herein includes a downhole tool and an acoustic logging module disposed on the downhole tool. The acoustic logging module includes an acoustic transmitter, an acoustic receiver, and an acoustic isolator. The acoustic isolator surrounds a portion of the acoustic receiver, and the acoustic isolator has a layer to provide an acoustic impedance mismatch. The layer defines a plurality of spaces.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features such that the first and second features may not be in direct contact.

One or more aspects of the present disclosure relate to acoustic isolators. In some examples, an acoustic isolator is coupled to a base of an acoustic sensor. A transmitter and an acoustic attenuator may also be coupled to the base. The acoustic isolator may substantially surround one or more acoustic receivers. The acoustic isolator may include a first layer and a second layer. In some examples, the second layer includes two mediums having different acoustic impedances to provide an acoustic impedance mismatch. For example, the second layer may include a first medium (e.g., a ceramic) defining one or more spaces in which a second medium (e.g., air, Nitrogen, Helium, Carbon dioxide, and/or any other gas) is captured or in which a vacuum is provided. For example, the second layer may be a ceramic plate having a plurality of pores in which substantially no gas, liquid or other fluid invades (e.g. flows into the spaces) during operation, thereby providing a vacuum in at least one of the pores. In some examples, the pores may be substantially filled with air and/or other gas(es). In some examples, the first layer may seal a surface of the second layer to prevent fluid(s) from invading the spaces and/or capture gas(es) within the second layer. In some examples, the acoustic isolator includes a third layer having a third medium (e.g., metal) to provide a second acoustic impedance mismatch. The acoustic isolator may define an opening facing away from the transmitter through which the receiver receives an acoustic signal.

Figure 1:
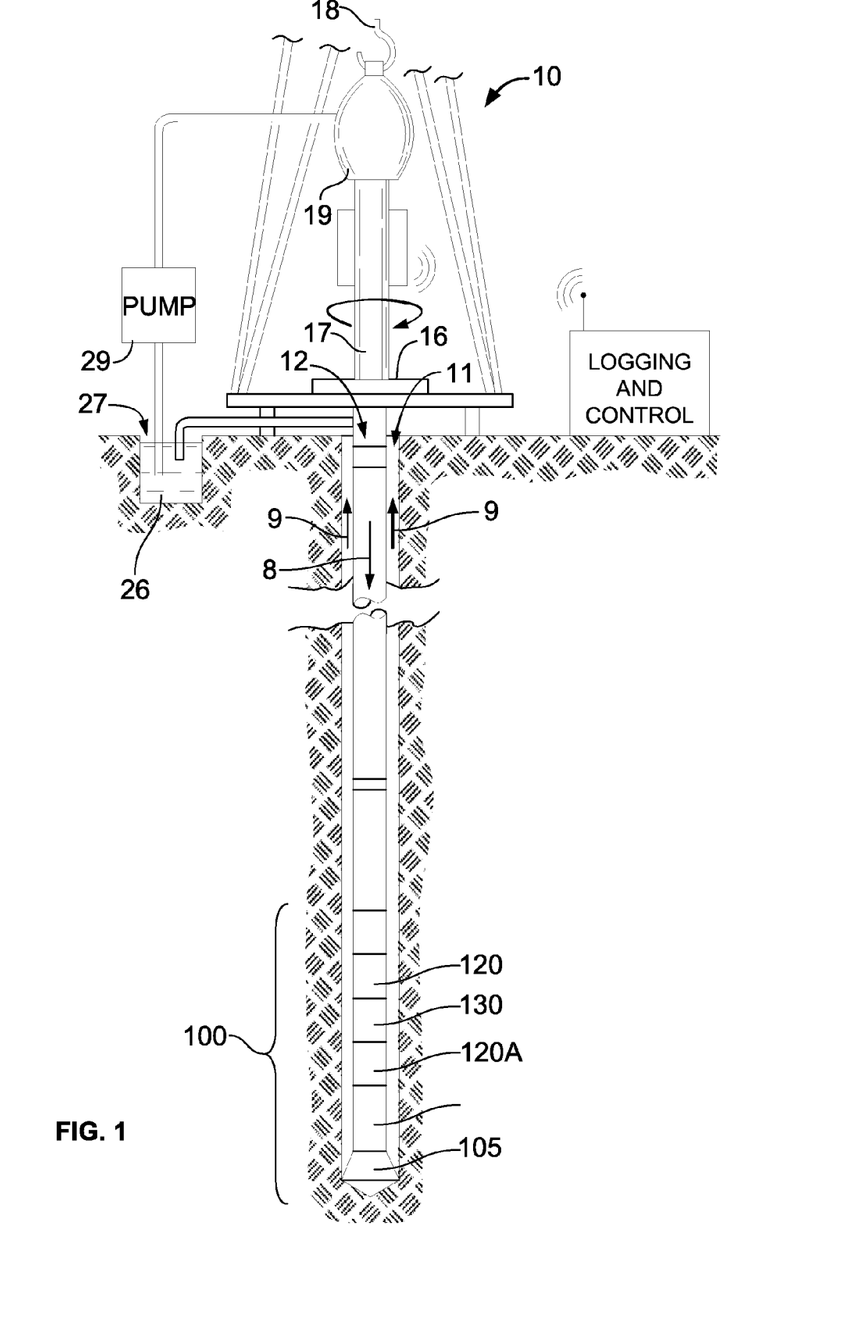
FIG. 1 illustrates an example system in which embodiments acoustic isolators can be implemented.

FIG. 1 illustrates a wellsite system in which the examples disclosed herein can be employed. The wellsite can be onshore or offshore. In this example system, a borehole 11 is formed in subsurface formations by rotary drilling in a manner that is well known. Examples can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole or wellbore 11, the assembly 10 including a rotary table 16, kelly 17, hook 18 and rotary swivel 19. The drill string 12 is rotated by the rotary table 16, energized by means not shown, which engages the kelly 17 at the upper end of the drill string 12. The drill string 12 is suspended from the hook 18, attached to a traveling block (also not shown), through the kelly 17 and the rotary swivel 19, which permits rotation of the drill string 12 relative to the hook 18. As is well known, a top drive system could be used.

In the illustrated example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this well-known manner, the drilling fluid 26 lubricates the drill bit 105 and carries formation cuttings up to the surface as it is returned to the pit 27 for recirculation.

The bottom hole assembly 100 of the illustrated example includes a logging-while-drilling (LWD) module 120, one or more measuring-while-drilling (MWD) module 130, a rotosteerable system and motor, and drill bit 105.

The LWD module 120 is housed in a special type of drill collar, as is known in the art, and can contain one or a plurality of known types of logging tools. It will also be understood that more than one LWD and/or MWD module can be employed, for example, as represented at 120A. References throughout to a module at the position of 120 can mean a module at the position of 120A as well. The LWD module includes capabilities for measuring, processing, and storing information, as well as for communicating with the surface equipment. In the illustrated example, a logging and control unit 140 includes an acoustic logging device.

The MWD module 130 is also housed in a special type of drill collar, as is known in the art, and can contain one or more devices for measuring characteristics of the drill string 12 and drill bit 105. The MWD tool further includes an apparatus (not shown) for measuring characteristics of the drill string and drill bit. The MWD tool further includes an apparatus (not shown) for generating electrical power to the downhole system. This may include a mud turbine generator powered by the flow of the drilling fluid 26, it being understood that other power and/or battery systems may be employed. In the illustrated example, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
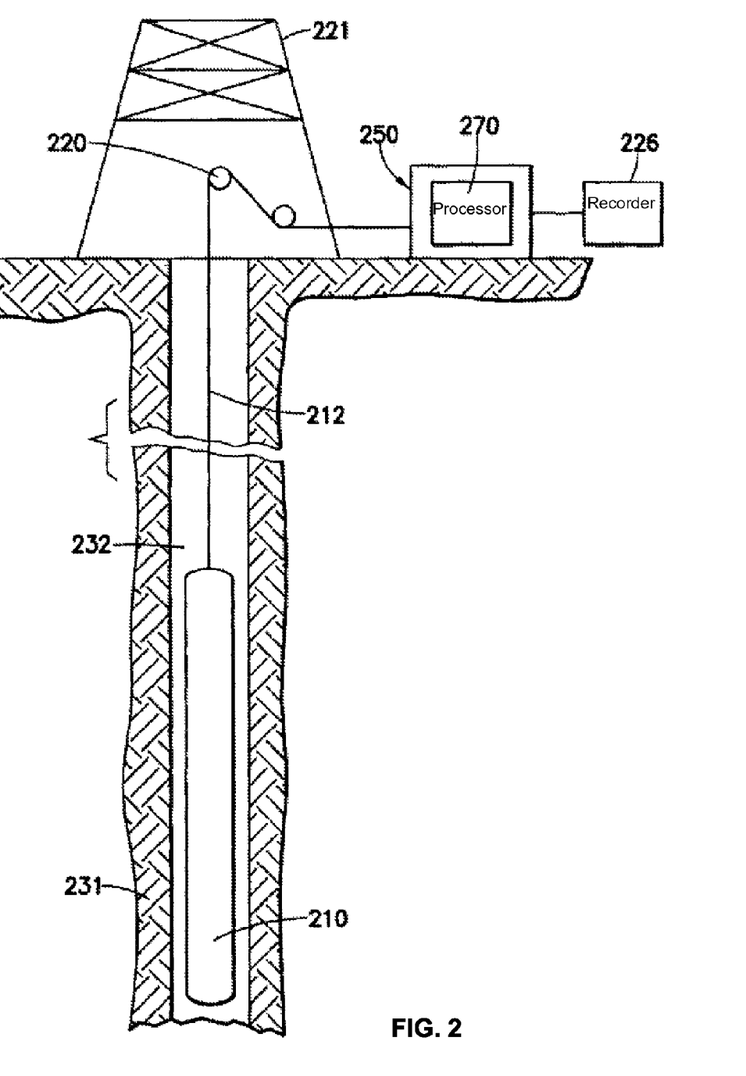
FIG. 2 illustrates another example system in which embodiments of acoustic isolators can be implemented.

FIG. 2 illustrates an example wireline tool 210, which may be used to implement examples disclosed herein. Some aspects of the example wireline tool 210 of FIG. 2 are described in U.S. Pat. No. 6,641,716, filed on Dec. 19, 2000, to Plona et al., titled "Sonic Well Logging for Characterizing Earth Formations," which is hereby incorporated by reference herein in its entirety. In the illustrated example, the wireline tool 210 is disposed in a borehole 232 adjacent a subterranean formation 231. The example wireline tool 210 is suspended on a cable 212. In some examples, the wireline tool 210 includes centralizers. The example cable 212 is coupled to surface equipment 250 via a wheel 220, which may facilitate conveyance of the example wireline tool 210. A derrick 221 is disposed over the borehole 231 in the illustrated example. Information may be communicated between the surface equipment 250 and the wireline tool 210 via the cable 212. In some examples, electrical power is communicated to the wireline tool 210 via the cable 212. The example surface equipment 250 includes a processor subsystem 270, which may include a microprocessor, a memory, a clock, input and/or output devices, peripheral equipment, a recorder 226, and/or other surface equipment. In the illustrated example, the wireline tool 210 is a Dipole Shear Sonic Imager ("DSI™").

Figure 3:
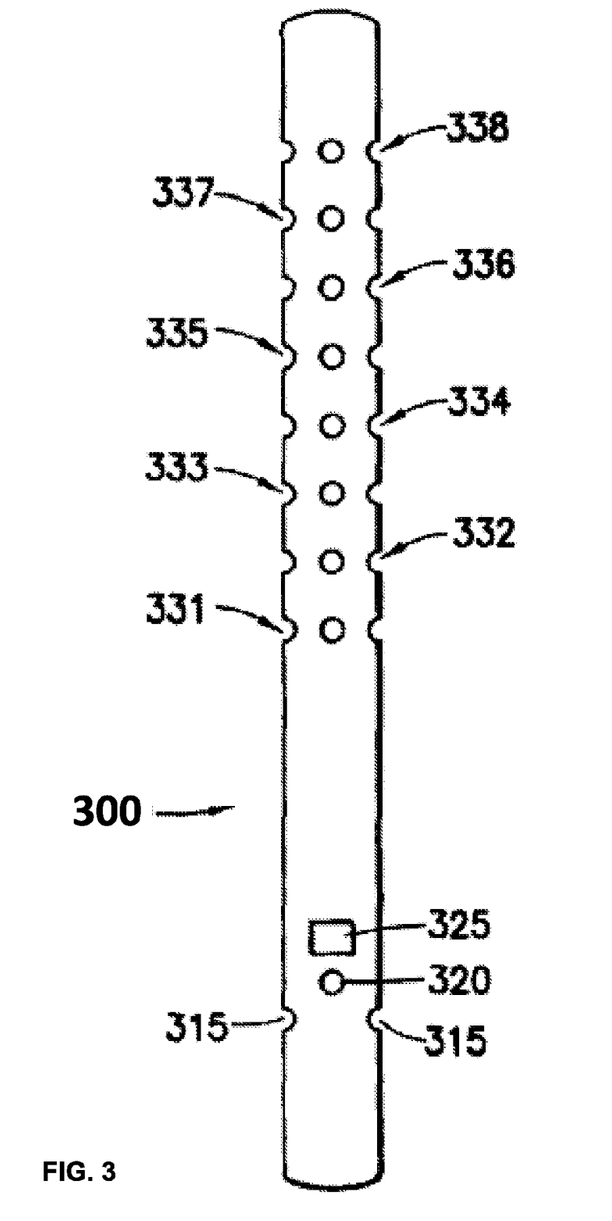
FIG. 3 illustrates yet another example system in which embodiments of acoustic isolators can be implemented.

FIG. 3 illustrates an acoustic logging tool 300 of the example wireline tool 210 of FIG. 2. In the illustrated example, the acoustic logging tool 300 includes crossed dipole transmitters 315 and 320 and a monopole transmitter 325. The example acoustic logging tool 300 may excite compressional, shear, Stonely, flexural, and/or other waves. The example acoustic logging tool 300 of FIG. 3 includes receiver stations 331, 332, 333, 334, 335, 336, 337 and 338. Other examples include other numbers of receiver stations. Example disclosed herein may be implemented in conjunction with other downhole tools such as, for example, the downhole tools described in U.S. Pat. No. 6,739,423, filed on Oct. 15, 2002, to Tashiro et al., titled "Acoustic Logging Tool;" U.S. Pat. No. 6,474,439, filed on May 29, 2000, to Hoyle et al., titled "Dipole Logging Tool;" U.S. Pat. No. 6,494,288, filed on Dec. 11, 2000, to Tashiro et al., titled "Acoustic Logging Tool;" U.S. Pat. No. 7,336,562, filed on Sep. 8, 2003, to Hoyle et al., titled "Sonic Logging Tool Including Receiver and Spacer Structure;" and U.S. Pat. No. 7,334,661, filed Feb. 5, 2004, to Pahon et al., titled "Acoustic Logging Tool Sleeve," the disclosures of which are hereby incorporated herein by reference in their entireties.

Figure 4:
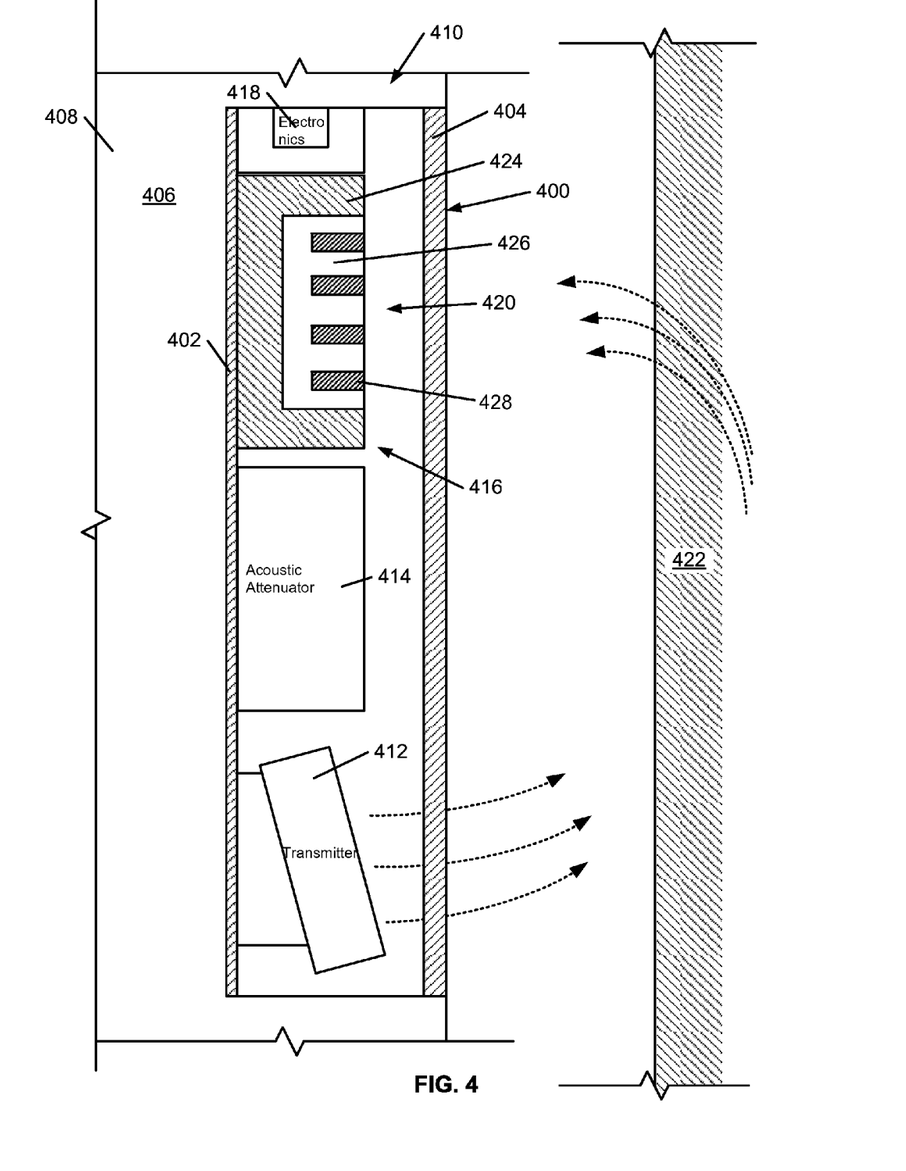
FIG. 4 illustrates various components of an example device that can implement embodiments of acoustic isolators.

FIG. 4 illustrates an example acoustic sensor 400 disclosed herein, which may be used to implement the acoustic logging device of FIG. 1, the example acoustic logging tool 300 of FIG. 3, etc. The example acoustic sensor 400 of FIG. 4 includes a base 402 and a cover 404. In the illustrated example, the cover 404 defines a portion of a collar 406 of an acoustic logging module 408 of a downhole tool 410 (e.g., the LWD tool 120 of FIG. 1, the acoustic logging tool 300 of FIG. 3, etc.). The example base 402 of FIG. 4 is disposed inside the downhole tool 410. In the illustrated example, the base 402 is a metal frame. A transmitter 412 (e.g., a sonic and/or ultrasonic transmitting source), an acoustic attenuator 414, a receiver assembly 416, and electronics 418 are coupled to the base 402. In the illustrated example, the transmitter 412 is a distance of about three inches from a nearest receiver 428 of a receiver array 420 of the receiver assembly 416. However, the above-noted dimension is merely an example and, thus, other dimensions may be used without departing from the scope of this disclosure. In the illustrated example, the acoustic attenuator 414 is disposed between the receiver assembly 416 and the transmitter 412.

The example transmitter 412 of FIG. 4 may be any suitable transmitter capable of generating an acoustic signal. In some examples, the transmitter 412 includes a piezoelectric or magnetostrictive material to generate the acoustic signal. The transmitter 412 may be excited as monopoles. The transmitter 412 may generate a signal having a sonic frequency or an ultrasonic frequency. In the illustrated example, the example transmitter 412 of FIG. 4 generates a signal that propagates through the cover 404 and toward a subterranean formation 422 adjacent the downhole tool 410. The signal may penetrate a portion of the subterranean formation 422 and be refracted toward the acoustic receiver assembly 416. A portion of the signal refracted toward acoustic sensor 400 that is to be received via the receiver array 420 is referred to herein as a target signal.

In some examples, acoustic waves and/or acoustic energy other than the target signal propagate along the acoustic sensor 400. For example, acoustic waves may propagate between the transmitter 412 and the receiver assembly 416 when the transmitter 412 generates the acoustic signal. In the illustrated example, the acoustic attenuator 414 decreases wave energy and/or amplitudes of the waves propagating between the transmitter 412 and the receiver assembly 416 by scattering (e.g., reflecting, refracting, diverging, spreading, etc.) the waves, absorbing the waves, converting a mode of the waves, etc. In some examples, when the transmitter 412 transmits the acoustic signal toward the subterranean formation 422, the transmitter 412 excites the base 402 and the collar 406 of the downhole tool 410, thereby propagating acoustic energy along the downhole tool 410.

The example receiver assembly 416 of FIG. 4 includes the receiver array 420 and an acoustic isolator 424. The acoustic isolator 424 substantially isolates the receiver array 420 from the acoustic waves and/or the acoustic energy propagating along the base 402 and/or the downhole tool 410 while enabling the receiver array 420 to receive the target signal. The example receiver array 420 of FIG. 4 is coupled to the acoustic isolator 424 and substantially surrounded by the acoustic isolator 424. The example acoustic isolator 424 of FIG. 4 defines an opening 426 facing the cover 404 to enable the receiver array 420 to receive the target signal via the opening 426. Thus, in the illustrated example, the opening 426 faces substantially away from the transmitter 412. As described in greater detail below, the acoustic isolator 424 isolates the receiver array 420 from the acoustic waves and the acoustic energy propagating along the acoustic sensor 400 by providing at least one acoustic impedance mismatch.

Figure 5:
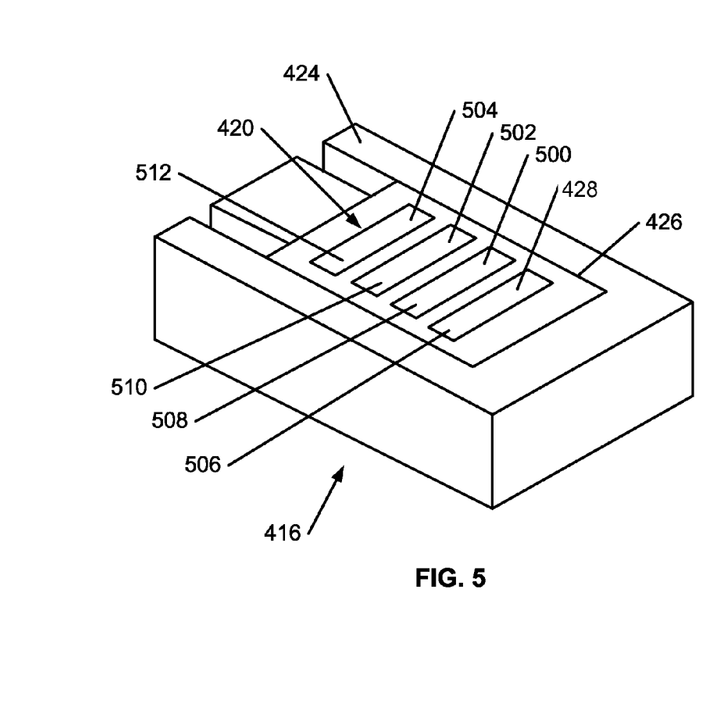
FIG. 5 illustrates various components of the example device of FIG. 4 that can implement embodiments of acoustic isolators.

FIG. 5 is a perspective view of the example receiver assembly 416 of FIG. 4. In the illustrated example, the receiver array 420 includes four receivers 428, 500, 502 and 504. Other examples include other numbers of receivers (e.g., 1, 2, 3, 5, etc.). In the illustrated example, although the receivers 428, 500, 502 and 504 are substantially surrounded by the acoustic isolator 424, receiving sides 506, 508, 510 and 512 of the receivers 428, 500, 502 and 504 are exposed to the target signal via the opening 426.

Figure 6:
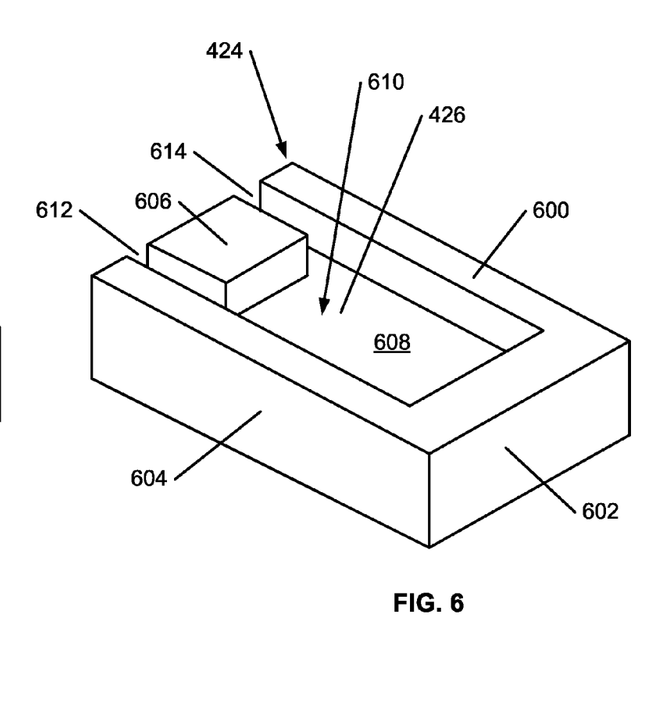
FIG. 6 illustrates various components of the example device of FIG. 4 that can implement embodiments of acoustic isolators.

FIG. 6 is a perspective view of the acoustic isolator 424 of the example receiver assembly 416 of FIG. 5. In the illustrated example, the acoustic isolator 424 includes a first sidewall 600, a second sidewall 602, a third sidewall 604, a fourth sidewall 606, and a bottom-wall 608. The walls 600, 602, 604, 606 and 608 of the example acoustic isolator 424 define the opening 426 and a five-sided cavity 610 in which the receiver array 420 is to be disposed. As a result, in the illustrated example, the acoustic isolator 424 surrounds five sides of the receiver array 420. Other examples define cavities having other shapes to substantially surround the receiver array 420. In the illustrated example, the fourth sidewall 606 includes a first channel 612 and a second channel 614. In some examples, wires and/or other components extend through the first channel and/or the second channel to couple the receiver array 420 to the electronics 418. In other examples, the acoustic isolator 424 surrounds fewer, additional and/or different portions of the receiver array 420.

Figure 7:
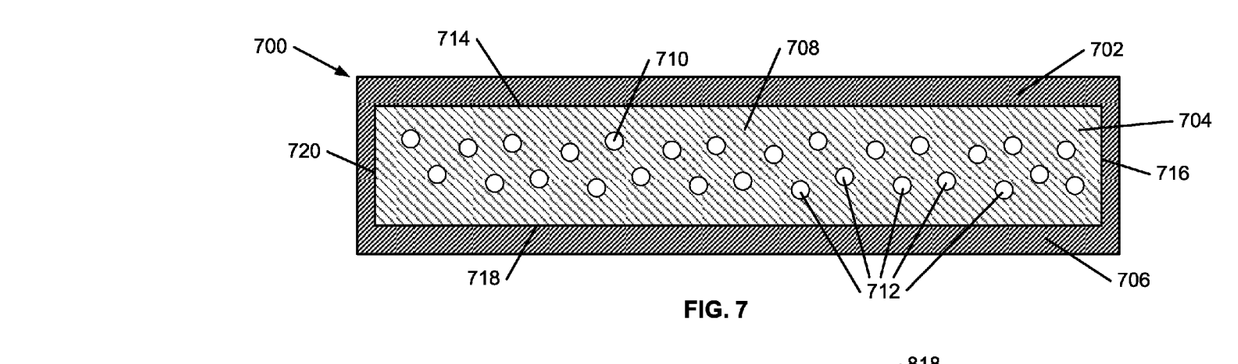
FIG. 7 illustrates various components of an example device that can implement embodiments of acoustic isolators.

FIG. 7 is an enlarged, cross-sectional view of an example wall 700, which may be used to implement the first sidewall 600, the second sidewall 602, the third sidewall 604, the fourth sidewall 606 and/or the bottom-wall 608 of the example acoustic isolator 424 of FIG. 6. In the illustrated example, the wall 700 includes a first layer 702, a second layer 704 and a third layer 706. In the illustrated example, the first layer 702 and the third layer 706 are integrally formed and substantially surround the second layer 704. Thus, the first layer 702 and the third layer 706 define exterior surfaces of the wall 700. In other examples, the first layer 702 and the third layer 706 are not integrally formed and/or surround a portion of the second layer 704. For example, the first layer 702 may be disposed on one side of the second layer 704, and the fourth layer 808 may be disposed on an opposing side of the second layer 704 (e.g., the first layer 702 may not be directly connected to the third layer 706).

In some examples, the wall 700 of FIG. 7 is oriented such that acoustic signals and acoustic energy propagate through the first layer 702 to the second layer 704 (e.g., the first layer 702 defines a portion of a cavity in which a receiver array is to be disposed). In other examples, the wall 700 of FIG. 7 is oriented such that acoustic energy propagates through the third layer 706 to the second layer 704 (e.g., the third layer 706 defines a portion of the cavity in which the receiver array is to be disposed). Thus, the first layer 702, the second layer 704, and the third layer 706 are to be disposed between acoustic waves and/or acoustic energy (other than the target signal) and the receiver array.

The example second layer 704 includes a first medium 708 and a second medium 710 having different acoustic impedances. Thus, the example second layer 704 provides an acoustic impedance mismatch. As a result, the example second layer 704 substantially reflects acoustic waves and/or acoustic energy that propagate into the example second layer 704, thereby substantially preventing the acoustic waves and/or the acoustic energy from reaching the receiver array 420. In the illustrated example, the first medium 708 of the second layer 704 defines one or more spaces 712 to be substantially filled with the second medium 710. In some examples, the first medium 708 is composed of one or more materials defining gaps, holes, sockets, pockets, pores, slots, chambers, and/or any other suitable space(s). In the illustrated example, the first medium 708 is composed of ceramic having a plurality of pores, and the second medium 710 is a vacuum provided in at least one of the pores. In some examples, the second medium 710 is air and/or other gas(es) that substantially fills at least one of the spaces 712.

During downhole operation of the example acoustic isolator 424, the acoustic isolator 424 may be subjected to pressures of up to twenty-five thousand pounds per square inch. In the illustrated example, the first layer 702 and the third layer 706 seal surfaces 714, 716, 718 and 720 of the second layer 704 to prevent fluid (e.g., drilling mud, formation fluid, oil, etc.) from invading (e.g., flowing into) the spaces 712 of second layer 704 and/or to prevent gas(es) from flowing out of the second layer 704 (e.g., the first layer 702 and the third layer 706 may capture air within the pores of the second layer 704). The first layer 702 and the third layer 706 may be formed by applying a coating to the surfaces 714, 716, 718 and 720 second layer 704, molding a material to the surfaces 714, 716, 718 and 720 of the second layer 704, and/or by any other technique(s). For example, the first layer 702 and the third layer 706 illustrated in FIG. 7 are a polyetheretherketone (PEEK) overmolding. In some examples, the first layer 702 and the third layer 706 are formed via a polytetrafluoroethylene (PTFE) coating. In some examples, first layer 702 and/or the third layer 706 has a thickness of about one hundred micrometers.

Figure 8:
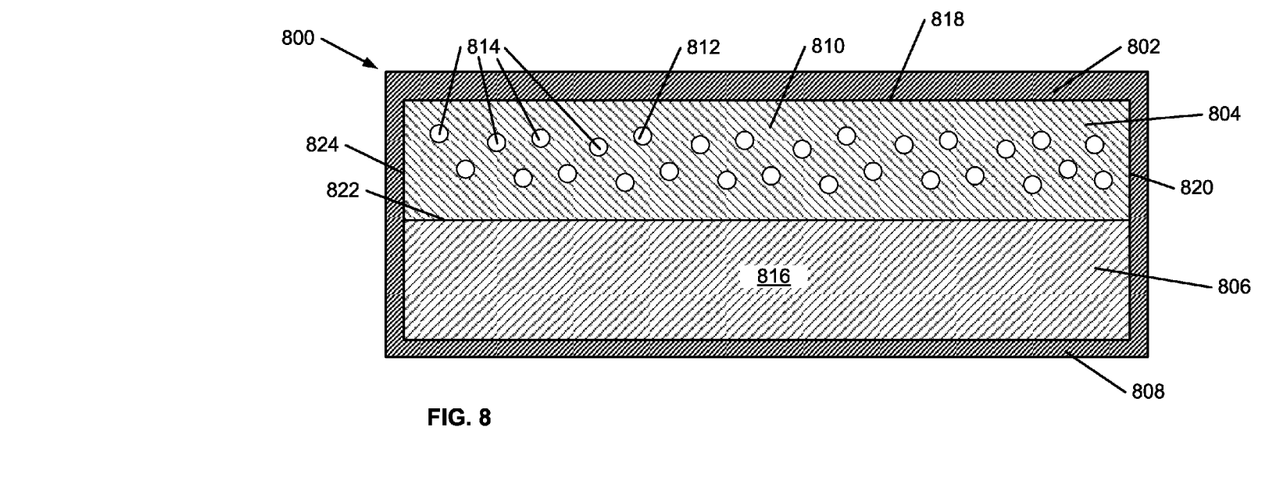
FIG. 8 illustrates various components of an example device that can implement embodiments of acoustic isolators.

FIG. 8 illustrates another example wall 800 disclosed herein, which may be used to implement the first sidewall 600, the second sidewall 602, the third sidewall 604, the fourth sidewall 606 and/or the bottom-wall 608 of the example acoustic isolator 424 of FIG. 6. The example wall 800 of FIG. 8 includes a first layer 802, a second layer 804, a third layer 806 and a fourth layer 808. In the illustrated example, the first layer 802 and the fourth layer 808 are integrally formed and substantially surround the second layer 804 and the third layer 806. Thus, the first layer 802 and the fourth layer 808 define exterior surfaces of the wall 800. In other examples, the first layer 802 and the fourth layer 808 are not integrally formed and/or surround a portion of the second layer 804 and/or the third layer 806.

In some examples, the wall 800 of FIG. 8 is oriented such that acoustic signals and acoustic energy propagate through the first layer 802 to the second layer 804 (e.g., the first layer 802 defines a portion of a cavity in which a receiver array is to be disposed). In other examples, the wall 800 of FIG. 8 is oriented such that acoustic energy propagates through the fourth layer 808 to the third layer 806 (e.g., the fourth layer 808 defines a portion of the cavity in which the receiver array is to be disposed). Thus, the first layer 802, the second layer 804, the third layer 806 and the fourth layer 808 are to be disposed between acoustic waves and/or acoustic energy (other than the target signal) and the receiver array.

The example second layer 804 includes a first medium 810 and a second medium 812 having different acoustic impedances. Thus, the example second layer 804 provides an acoustic impedance mismatch. As a result, the example second layer 804 substantially reflects acoustic waves and/or acoustic energy that propagate into the example second layer 804, thereby substantially preventing the acoustic waves and/or the acoustic energy from reaching the receiver array 420. In the illustrated example, the first medium 810 of the second layer 804 defines one or more spaces 814. In some examples, the spaces 814 are gaps, holes, sockets, pockets, pores, slots, chambers, and/or any other suitable space(s). In the illustrated example, the first medium 810 is composed of ceramic having a plurality of pores, and the second medium 812 is a vacuum provided in at least one of the pores. In some examples, the second medium 821 is air and/or other gas(es) that substantially fills at least one of the spaces 814.

The example third layer 806 is composed of a third medium 816. In the illustrated example, the third medium 816 has an acoustic impedance different than the acoustic impedances of the first medium 810 and/or the second medium 812. Thus, the first medium 810 of the second layer 804 and the third medium 816 of the third layer 806 provide a second acoustic impedance mismatch to substantially reflect acoustic waves and/or acoustic energy. In the illustrated example, the third medium 816 is tungsten. However, the above-noted material is merely an example and, thus, other materials may be used without departing from the scope of this disclosure.

In the illustrated example, the first layer 802 seals one or more surfaces 818, 820, 822 and 824 of the second layer 804 to prevent fluid (e.g., drilling mud, formation fluid, oil, etc.) from invading (e.g., flowing into) the spaces 814 of second layer 804 or to prevent the gas(es) from flowing out of the second layer 804 (e.g., the first layer 802 may capture the air within the pores of the second layer 804). In some examples, the first layer 802 is a coating (e.g., a PTFE coating) applied to one or more surfaces 818, 820, 822 and 824 of the second layer 804. In the illustrated example, the first layer 802 and the fourth layer 808 couple the second layer 804 to the third layer 806. For example, the first layer 802 and the fourth layer 808 may be an overmolding (e.g., a PEEK overmolding) surrounding the second layer 804 and the third layer 806 to hold the second layer 804 in contact with the third layer 806 and seal the one or more surfaces 818, 820, 822 and 824 of the second layer 804.

Figure 9:
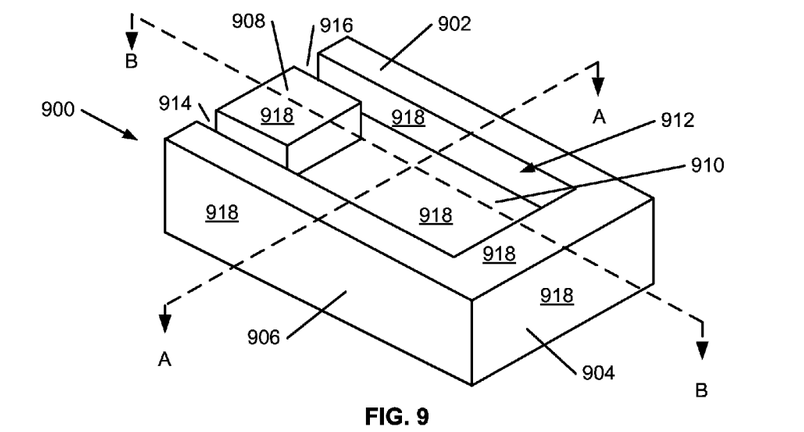
FIG. 9 illustrates various components of an example device that can implement embodiments of acoustic isolators.

FIG. 9 is a perspective view of another example acoustic isolator 900 disclosed herein, which may be used to implement the example acoustic isolator 424 of FIG. 4. In the illustrated example, the acoustic isolator 900 includes a first sidewall 902, a second sidewall 904, a third sidewall 906, a fourth sidewall 908, and a bottom-wall 910. Thus, the example acoustic isolator 900 defines a five-sided cavity 912 in which a receiver or receiver array is to be disposed and substantially surrounded by the walls 902, 904, 906, 908 and 910 of the acoustic isolator 900. Other examples define cavities having other shapes to substantially surround the receiver or receiver array. In the illustrated example, the fourth sidewall 908 includes a first channel 914 and a second channel 916. In some examples, wires and/or other components extend through the first channel 914 and/or the second channel 916 to couple the receiver to electronics (e.g., the electronics 418 of FIG. 4) and/or other components of an acoustic sensor. In the illustrated example, an overmolding 1000 (FIG. 10) (e.g., a PEEK overmolding) defines an outermost surface 918 of the acoustic isolator 900.

Figure 10:
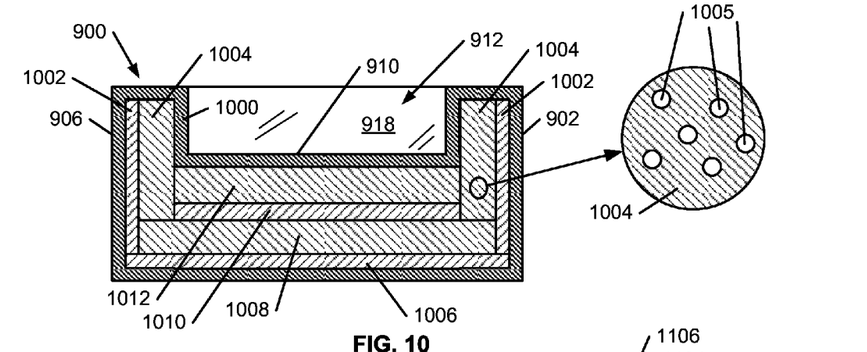
FIG. 10 illustrates various components of the example device of FIG. 9 that can implement embodiments of acoustic isolators.

FIG. 10 is a cross-sectional view of the example acoustic isolator 900 of FIG. 9 along line A-A. In the illustrated example, the first sidewall 902 and the third sidewall 906 each includes a first plate 1002 juxtaposed with a second plate 1004. The overmolding 1000 substantially covers portions of the first plates 1002 and the second plates 1004. Thus, the example first sidewall 902 and the example third sidewall 906 each include four layers. Other examples include other numbers of plates and/or layers.

In the illustrated example, the first plates 1002 are composed of a first material such as, for example, tungsten. The example second plates 1004 are composed of a second material. In some examples, the second plates 1004 define one or more spaces 1005 to provide vacuums within the second plates 1004 or enable gas(es) to be captured within the second plates 1004. In the illustrated example, the second material is a ceramic having the plurality of the spaces 1005 (e.g., pores), and the overmolding 1000 maintains a vacuum within the spaces 1005. In some examples, the overmolding 1000 capture gas(es) within at least one of the spaces 1005. The first material has a first acoustic impedance, the second material has a second acoustic impedance, and the vacuum has a third acoustic impedance. As a result, the first material of the first plates 1002 and the second material of the second plates provide a first acoustic impedance mismatch, and the second material of the second plates 1004 and the vacuum provide a second acoustic impedance mismatch. In other examples, the first plates 1002 are composed of the second material and the second plates 1004 are composed of the first material.

In the illustrated example, the bottom-wall 910 includes a third plate 1006 juxtaposed with a fourth plate 1008 juxtaposed with a fifth plate 1010 juxtaposed with a sixth plate 1012. The third plate 1006 and the fifth plate 1010 of the example bottom-wall 910 are composed of the first material. In the illustrated example, the fourth plate 1008 and the sixth plate 1012 of the bottom-wall 910 are composed of the second material. As a result, an acoustic impedance mismatch may occur at and/or in each of the four plates 1006, 1008, 1010 and 1012 of the example bottom-wall 910. In other examples, the third plate 1006 and the fifth plate 1010 are composed of the second material, and the fourth plate 1008 and the sixth plate 1012 are composed of the first material. The overmolding 1000 substantially covers a portion of the third plate 1006 and a portion of the sixth plate 1012. Thus, the example bottom-wall 910 includes six layers. Other examples include other numbers of plates and/or layers.

Figure 11:
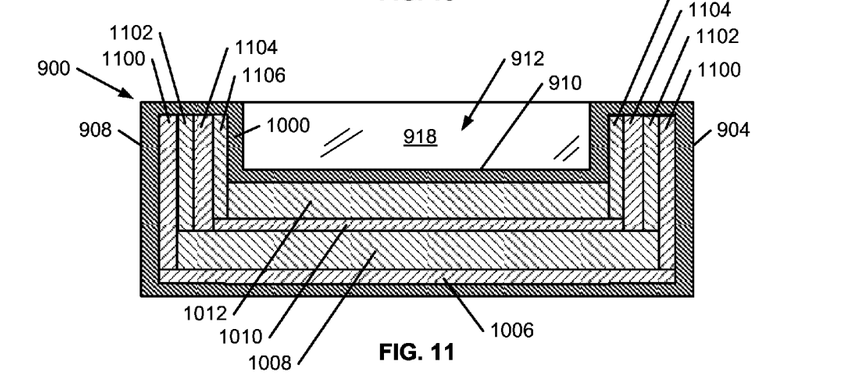
FIG. 11 illustrates various components of the example device of FIG. 9 that can implement embodiments of acoustic isolators.

FIG. 11 is a cross-sectional view of the example acoustic isolator 900 of FIG. 9 along line B-B. The second sidewall 904 and the fourth sidewall 908 each includes a seventh plate 1100 juxtaposed with an eighth plate 1102 juxtaposed with a ninth plate 1104 juxtaposed with a tenth plate 1106. The seventh plates 1100 and the ninth plates 1104 are composed of the first material. In the illustrated example, the eighth plates 1102 and the tenth plates 1106 are composed of the second material. As a result, an acoustic impedance mismatch may occur at and/or in each of the seventh, eighth, ninth and tenth plates 1100, 1102, 1104 and 1106. In other examples, the seventh plates 1100 and the ninth plates 1104 are composed of the second material, and the eighth plates 1102 and the tenth plate 1106 are composed of the first material. In the illustrated example, the overmolding 1000 substantially covers portions of the seventh plates 1100 and the tenth plates 1106. Thus, the examples second sidewall 904 and the example fourth sidewall 908 each include six layers. Other examples include other numbers of plates and/or layers.

Although only a few example embodiments have been described in detail above, those skilled in the art will readily appreciate that many modifications are possible in the example embodiments without materially departing from fluid filters. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
   a transmitter to transmit an acoustic signal;
   an acoustic isolator surrounding a receiver with one or more sidewalls and a bottom wall, the acoustic isolator having a first layer coupled to a second layer defining a plurality of spaces, the second layer to provide an acoustic impedance mismatch, wherein the receiver is to receive the acoustic signal via an opening defined by the one or more sidewalls and the bottom wall in the acoustic isolator; and
   a base, wherein the acoustic isolator and the transmitter are coupled to the same side of the base, and wherein the acoustic isolator uses the bottom wall to isolate the receiver from the acoustic signal propagated along the base.

2. The apparatus of claim 1 wherein the acoustic isolator surrounds five sides formed by the receiver in itself.

3. The apparatus of claim 1 wherein the spaces are pores.

4. The apparatus of claim 1 wherein the second layer provides a vacuum within at least one of the spaces of the second layer.

5. The apparatus of claim 1 wherein the first layer seals a surface of the second layer.

6. The apparatus of claim 1 wherein the first layer is an overmolding.

7. The apparatus of claim 1 wherein the acoustic isolator includes a third layer and a fourth layer, the third layer to provide a second acoustic impedance mismatch.

8. The apparatus of claim 1 wherein the base is disposed inside a downhole tool.

9. The apparatus of claim 1 wherein the opening faces away from the transmitter.

10. An apparatus, comprising:
    an acoustic transmitter coupled to one side of a base;
    an acoustic isolator coupled to the one side of the base, the acoustic isolator including a first layer and a second layer, the first layer including a plurality of pores;
    an acoustic receiver coupled to the acoustic isolator, wherein the acoustic isolator comprises one or more sidewalls and a bottom wall to surround a portion of the acoustic receiver, wherein the bottom wall is to isolate the acoustic receiver from an acoustic signal propagated along the base; and
    an acoustic attenuator coupled to the one side of the base, the acoustic attenuator disposed between the acoustic isolator and the acoustic transmitter.

11. The apparatus of claim 10 wherein the first layer is composed of a first material and the second layer is composed of a second material different than the first material.

12. The apparatus of claim 10 wherein the base is disposed inside a downhole tool.

13. The apparatus of claim 10 wherein the first layer provides an acoustic impedance mismatch.

14. The apparatus of claim 10 wherein the acoustic isolator surrounds five sides formed by the acoustic receiver in itself.

15. The apparatus of claim 10 further comprising a third layer and a fourth layer, the third layer including a plurality of pores.

16. An apparatus comprising;
    a downhole tool; and
    an acoustic logging module disposed on the downhole tool, the acoustic logging module including an acoustic transmitter, an acoustic receiver, and an acoustic isolator surrounding five sides formed by the acoustic receiver in itself and defining an opening, the acoustic isolator having a layer to provide an acoustic impedance mismatch, the layer defining a plurality of spaces, wherein the acoustic isolator comprises one or more sidewalls and a bottom wall for surrounding the five sides and defining the opening, wherein the bottom wall is placed on a base with the acoustic transmitter and to isolate the acoustic receiver from an acoustic signal propagated along the base.

17. The apparatus of claim 16 wherein the layer provides a vacuum in at least one of the spaces.

18. The apparatus of claim 16 wherein the acoustic isolator includes a second layer, the second layer sealing a surface of the layer.

19. The apparatus of claim 16 further comprising an acoustic attenuator disposed between the acoustic transmitter and the acoustic isolator.

* * * * *